(No Model.)
F. A. BUNNELL.
APPARATUS FOR PURIFYING WATER.
No. 445,537. Patented Feb. 3, 1891.
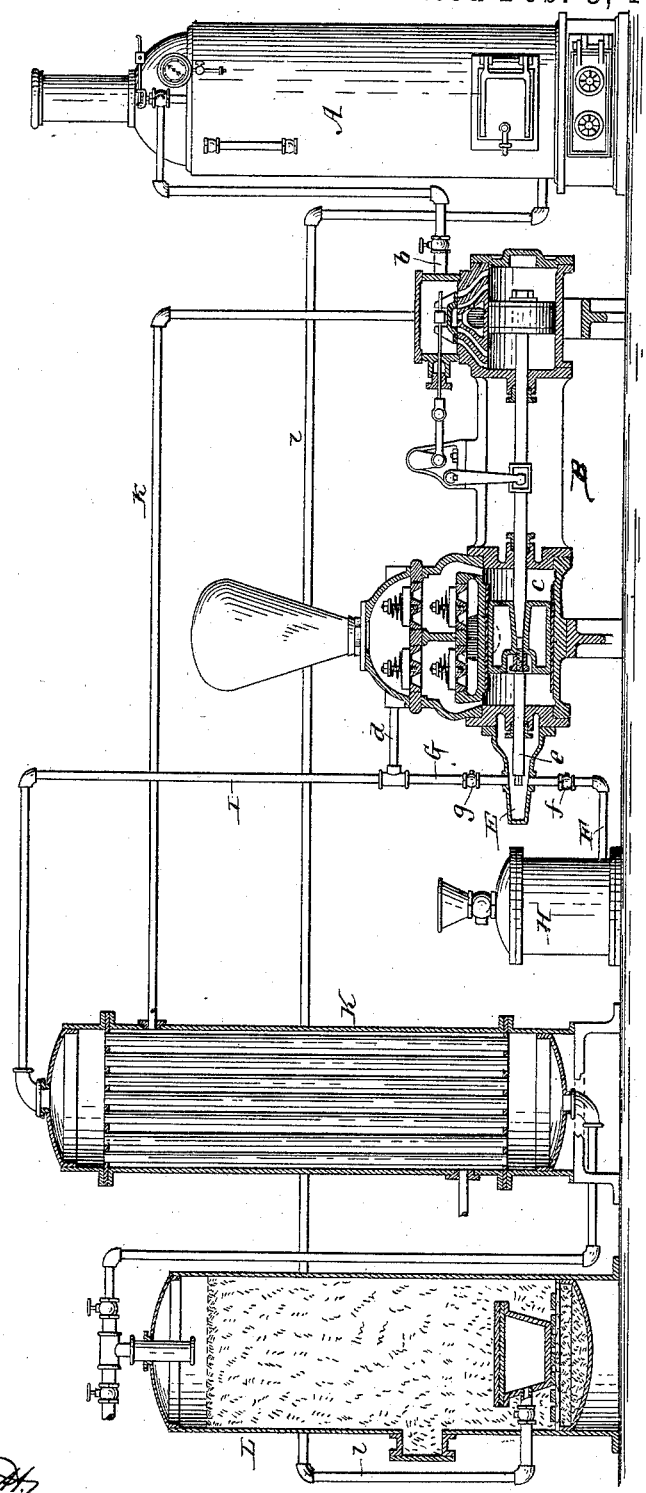
Witnesses:
Jacob Nussenblatt
Thos. L. Popp
Francis A. Bunnell, Inventor:
By Edward Wilhelm, Attorney.

United States Patent Office.

FRANCIS A. BUNNELL, OF SYRACUSE, NEW YORK, ASSIGNOR TO CHRISTOPHER C. BRADLEY AND MARY E. BUNNELL, BOTH OF SAME PLACE.

APPARATUS FOR PURIFYING WATER.

SPECIFICATION forming part of Letters Patent No. 445,537, dated February 3, 1891.

Application filed March 31, 1890. Serial No. 345,984. (No model.)

*To all whom it may concern:*

Be it known that I, FRANCIS A. BUNNELL, a citizen of the United States, residing at Syracuse, in the county of Onondaga and State of New York, have invented a new and useful Improvement in Methods of and Apparatus for Purifying Water, of which the following is a specification.

This invention relates to the removal of scale-forming impurities from water in a simple and expeditious manner. The scale-forming impurities contained in the feed-water for steam-boilers consist in many localities principally of bicarbonate of lime and sulphate of lime, both of which substances are held in solution. By heating the feed-water to a suitable temperature the bicarbonate of lime is decomposed into carbonate of lime, which is insoluble, and carbon dioxide. The sulphate of lime can be decomposed by adding carbonate of soda, whereby carbonate of lime and sulphate of soda are formed, the former being insoluble, while the latter remains in solution in the boiler and does not form scale.

The object of my invention is to effect in a simple and continuous manner the operation whereby the soluble impurities are converted into insoluble matter, which can be filtered out, and soluble matter, which will not form scale in the boiler.

The accompanying drawing represents my improved apparatus for purifying the water.

A represents a steam-boiler of any ordinary or suitable construction.

B represents a feed-pump; $b$, the steam-pipe leading from the boiler to the steam-chest of the pump, and $c$ the main pumping-cylinder, which receives the feed-water from any available source and delivers it through the pipe $d$.

E is an auxiliary pumping-cylinder secured to the rear end of the main pumping-cylinder $c$, and $e$ the auxiliary piston secured to the piston of the main pumping-cylinder.

F is the suction-pipe of the auxiliary pump, provided with a check-valve $f$, and G the delivery-pipe, provided with a check-valve $g$.

H represents a tank containing a solution of carbonate of soda or of some other precipitant prepared with reference to the particular kind and quality of impurities contained in the feed-water. The suction-pipe of the auxiliary pump connects with this tank, so as to take its supply therefrom. The solution of the precipitant is so prepared that it will render insoluble all the sulphate of lime or other similar impurity which may be contained in the feed-water and which would not otherwise be rendered insoluble by heating the water. In some localities the feed-water contains substances which act as precipitants for the sulphate of lime under the application of heat, and when this is the case only so much of the precipitant is required to be injected into the feed-water as is necessary to decompose so much of the sulphate of lime as will not be decomposed by the precipitant already contained in the water. The auxiliary pump is so proportioned or regulated as to inject proper quantities of the precipitant into the feed-water at suitable intervals. In the construction represented in the drawing the main pump is double-acting and the auxiliary pump is single-acting, so that there is one injection of the precipitant for each double stroke of the main piston. The delivery-pipes G and $d$ of the auxiliary pump and main pump connect with the same discharge-pipe I, which leads to the top of a feed-water heater K, of any suitable or well-known construction.

$k$ represents the exhaust-steam pipe by which this heater is heated. In passing downwardly through this heater the water charged with the precipitant is heated nearly to the boiling-point, whereby the bicarbonate of lime is converted into carbonate of lime and carbon dioxide, and the sulphate of lime is decomposed by the action of the carbonate of soda, forming carbonate of lime and sulphate of soda. The water passes from the lower end of the heater into the upper end of a filter L, of any ordinary or suitable construction, in which the carbonate of lime and other insoluble impurities are separated from the water. The purified water escapes from the filter through a pipe $l$ and passes to the steam-boiler or other apparatus in which it is to be used or to a storage-tank.

When the water is used in a steam-boiler, the proportion of sulphate of soda in the boiler-water increases as the water is evaporated, and fresh water containing sulphate of soda is supplied. When a point of concentration is reached which renders the water objectionable, it is blown off. By injecting the precipitant into the feed-water before the latter reaches the heater and causing the precipitant to pass through the heater with the water the deposit of scale on the surfaces of the heater is prevented, because the precipitant converts the scale-forming ingredients into a granular substance which does not adhere, but moves through the heater with the water. When the precipitant is injected after the water has passed through the heater, considerable scale is formed in the heater by the heating of the water, which is avoided by my process.

I claim as my invention—

1. The herein-described method of purifying feed-water, which consists in injecting a precipitant into the feed-water, then heating the feed-water containing the precipitant, whereby the impurities held in solution are rendered insoluble in transit without forming scale deposits, and then passing the feed-water through a filter in which the insoluble matter is intercepted, substantially as set forth.

2. The combination, with the feed-water heater and its inlet-pipe, of a feed-pump and a precipitant-pump working in unison with the feed-pump, both pumps discharging into the inlet-pipe of the heater, and a filter which receives the heated water containing the precipitant from the heater, substantially as set forth.

Witness my hand this 28th day of March, 1890.

FRANCIS A. BUNNELL.

Witnesses:
THEO. L. POPP,
JACOB NUSSENBLATT.